United States Patent
Bodgren et al.

(10) Patent No.: US 6,931,738 B2
(45) Date of Patent: Aug. 23, 2005

(54) DEVICE AND PROCEDURE FOR ALIGNING OF COMPONENTS

(75) Inventors: Jan Bodgren, Lindome (SE); Peter Strömberg, Linköping (SE); Peter Sandström, Askim (SE); Henrik Petersson, Göteborg (SE)

(73) Assignee: A.P. Fixturlaser AB, Mölndal (SE)

( * ) Notice: Subject to any disclaimer, the term of this patent is extended or adjusted under 35 U.S.C. 154(b) by 0 days.

(21) Appl. No.: 10/496,298

(22) PCT Filed: Dec. 6, 2002

(86) PCT No.: PCT/SE02/02252
§ 371 (c)(1),
(2), (4) Date: May 21, 2004

(87) PCT Pub. No.: WO03/067187
PCT Pub. Date: Aug. 14, 2003

(65) Prior Publication Data
US 2004/0261278 A1 Dec. 30, 2004

(30) Foreign Application Priority Data
Dec. 6, 2001 (SE) ............................................. 01040997

(51) Int. Cl.⁷ ................................................ G01C 15/00
(52) U.S. Cl. ...................... 33/286; 33/293; 33/DIG. 21; 33/412; 356/622
(58) Field of Search ........................ 33/286, 293, 412, 33/529, DIG. 21

(56) References Cited

U.S. PATENT DOCUMENTS

| 4,231,161 | A | * | 11/1980 | Belfiore ......................... 33/655 |
| 4,249,294 | A | | 2/1981 | Belfiore |
| 5,987,762 | A | | 11/1999 | Toth et al. |
| 6,031,616 | A | | 2/2000 | Seiffert |
| 6,040,903 | A | * | 3/2000 | Lysen et al. .................. 33/412 |
| 6,098,297 | A | | 8/2000 | Belfiore |
| 6,374,507 | B1 | * | 4/2002 | Lehto ........................... 33/645 |
| 6,434,841 | B1 | * | 8/2002 | Stahl et al. .................... 33/286 |
| 6,704,115 | B1 | * | 3/2004 | Hamar ....................... 356/622 |
| 6,763,597 | B2 | * | 7/2004 | Lysen .......................... 33/286 |
| 2003/0051354 | A1 | * | 3/2003 | Segerstrom et al. .......... 33/286 |

FOREIGN PATENT DOCUMENTS

| EP | 1 041 358 A2 | 10/2000 |
| GB | 2 128 324 A | 4/1984 |
| SE | 516 983 C2 | 4/2002 |
| WO | WO 00/28275 A1 | 5/2000 |
| WO | WO 01/50082 A1 | 7/2001 |

* cited by examiner

Primary Examiner—Christopher W. Fulton
Assistant Examiner—Yaritza Guadalupe
(74) Attorney, Agent, or Firm—Birch, Stewart, Kolasch & Birch, LLP

(57) ABSTRACT

The invention relates to a device for alignment of a first component (1) and a second component (2) in a predetermined relation to each other, comprising a transmitter unit (7) arranged for mounting on said first component (1) and comprising a light source (9) for the generation of light radiation (10) with a predetermined pattern in the direction towards a receiver unit (11; 11', 22, 27; 27') arranged for mounting on said second component (2), where the receiver unit (11; 11') comprises a detection device (18a, 18b; 18a', 18b' 23a, 23b; 28a, 28b; 28'a, 28'b) for said light radiation (10). The invention is characterised in that said detector device (18a, 18b; 18a', 18b', 23a, 23b; 28a, 28b, 28'a, 28'b) comprises a first detector (18a, 18a' 23a; 28a; 28a') and a second detector (18b; 18b' 23b; 28b; 28'b), respectively, which are separated depthwise in relation to said transmitter unit (7). The invention also relates to a receiver unit (11; 11'; 22, 27; 27') for the above-mentioned type of alignment, and also a method for such alignment. By means of the invention, an improved alignment of for example belt discs is provided.

17 Claims, 4 Drawing Sheets

DEVICE AND PROCEDURE FOR ALIGNING OF COMPONENTS

TECHNICAL FIELD

The present invention relates to a device for aligning of a first component and a second component in a predetermined relation to each other, comprising a transmitter unit arranged for mounting on said first component and comprising a light source for generation of light radiation with a predetermined pattern in the direction towards a receiver unit arranged for mounting on said second component, where the receiver unit comprises a detector device for said light radiation.

The invention also relates to a receiver unit intended to co-operate with a transmitter unit for aligning of a first component and a second component in a predetermined relation to each other, which receiver unit is arranged for mounting on one of the components and arranged for detection of a light pattern emitted by said transmitter unit.

The invention also relates to a method for aligning of a first component and a second component in a predetermined relation to each other, comprising: mounting of a transmitter unit on said first component, mounting of a receiver unit on said second component, generation of a light pattern from the transmitter unit in the direction towards the receiver unit and detection of said light pattern by means of the receiver unit.

BACKGROUND OF THE INVENTION

In different contexts there is a need for a correct alignment of different components in relation to each other. In connection with operation of e.g. machines and fan constructions, the outgoing power is often transmitted from a propelling unit via a rotational movement of a shaft and a first component for power transmission to a second component for power transmission, which together with a further shaft form a part of a propelled unit. The components for power transmission can in turn be arranged for, by way of example, chain propulsion or belt propulsion. When belt propulsion is used, the power is transmitted via one or more belts which are tightened over two components in the form of belt discs which are aligned with each other.

At transmissions of the type belt propulsion, it is essential that the belt discs are aligned in relation to each other such that the belt discs are arranged with an extension along a common imaginary plane, which in turn results in that the belts are allowed to run over the belt discs completely straight without being effected by any lateral force. A misalignment of the belt discs may otherwise lead to an unnecessarily high wear of the belts and belt discs and an unnecessarily high power consumption (i.e. a reduced degree of efficiency) of the machines for which the belt discs are used.

In particular, alignment of belt discs is intended to reduce or preferably eliminate possible parallel errors, angular errors and so called twist errors between the belt discs. The term parallel error means that the belt discs have their extensions along two different planes which are parallel in relation to each other. Angular error means that those planes along which the belt discs are arranged have a certain angle in relation to each other. Twist errors means that those planes along which the belt discs are arranged have been turned to a different degree along an imaginary longitudinal line which runs along the centre of the belt discs.

By a correct alignment, it can be seen to that the belt discs are placed along a common plane without the occurrence of any of the above-mentioned errors.

From the Swedish patent application SE 0000024-0, filed by the same applicant as the present application, an arrangement for alignment of belt discs is previously known. This arrangement comprises a first measuring unit and a second measuring unit, where the respective measuring unit is arranged for generation of laser light in the direction towards each other and for detection of incident light from the opposite unit. By detecting the incident light, it may be established if the position of the two belt discs has to be adjusted in relation to each other.

Although this known device provides an accurate detection and a reliable function, there is a need for continued improvements within the current technical field.

DISCLOSURE OF INVENTION

A principal object with the present invention is to provide an improved device and an improved method for alignment of components, especially in the form of belt discs.

This object is achieved by means of a device of a kind mentioned in the preamble, which characterising features are apparent from the appended claim 1, where said detection device comprises a first detector and a second detector, respectively, which are separated depthwise in relation to said transmitter unit.

Said object is also achieved by means of a receiver unit of a kind mentioned in the preamble, which characterising features are apparent from the appended claim 16, and which comprises a detection device which in turn comprises a first detector and a second detector, respectively, which are separated depthwise in relation to said transmitter unit.

Said purpose is also achieved by means of a method of a kind mentioned in the preamble, which characterising features are apparent from the appended claim 17 and which is characterised in that said detection comprises detection of said light pattern with a first detector and a second detector, respectively, which are arranged on said receiver unit in such a way that they are separated depthwise in relation to said detector unit.

By means of the invention a number of advantages are obtained. Principally, it may be noted that the invention admits a simple and effective alignment of for example belt discs, which may be performed at a low cost. The receiver unit according to the invention has a simple and compact design and is easy to operate. By in particular using two detectors which are placed in two separate planes perpendicular to the propagation direction of the light pattern, the invention may be used for a simultaneous detection of any present parallel, angular and twist errors. The construction of the receiver unit also enables an absolute determination of these three different types of error, independently of the geometry of the components, for example belt discs, which shall be aligned.

Further, the invention admits different detection methods, e.g. a purely visual detection by an operator or an electronic detection by means of photo-sensitive detectors. At the latter type of detection, a display of the results may be made by means of, for example, light emitting diodes or a display.

BRIEF DESCRIPTION OF DRAWINGS

The invention shall in the following be explained more closely with reference to an example of a preferred embodiment and the appended drawings, where.

PREFERRED EMBODIMENTS

Figure 1:
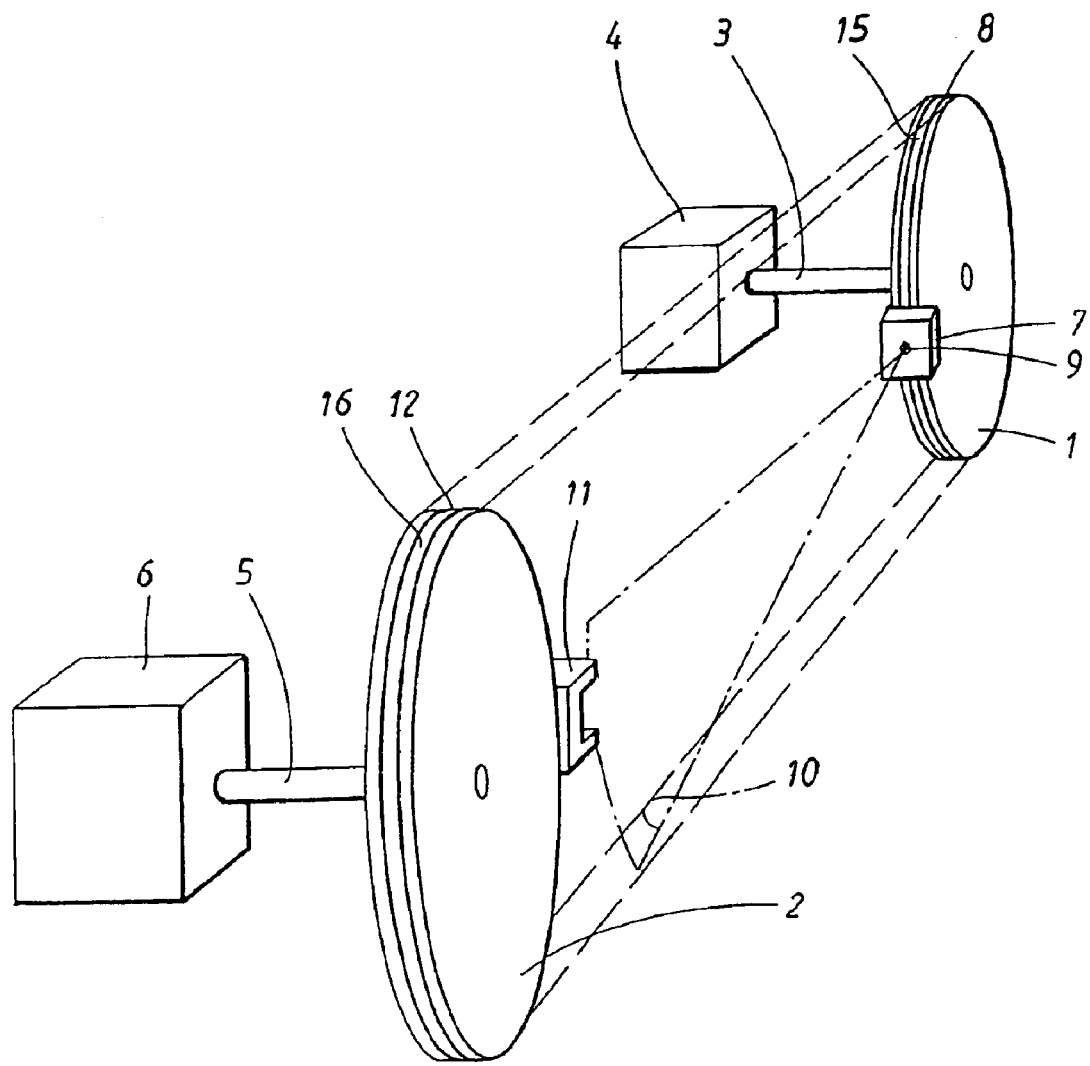
FIG. 1 is a perspective view which shows a device according to the present invention, where alignment is performed for two belt discs in relation to each other.

In FIG. 1 a perspective view of a device according to the present invention is shown. The invention is in particular, but not exclusively, intended to be used at alignment of two power transmitting belt discs 1, 2 in relation to each other, i.e. positioning them along an imaginary common plane, in what way twist, angular and parallel errors between the belt discs 1, 2 are reduced or preferably totally eliminated.

The invention is suitable to be used at the type of alignment of two components in relation to each other where there is a desire to position these two components along a common plane. In particular, the invention may be used at applications that comprise power transmission by means of rotating transmission devices, for example of the type chain propulsion or belt propulsion, and may then be used e.g. in connection with fan systems or machines.

The invention will in the following be described with reference to FIGS. 1 and 2, which show an embodiment comprising belt propulsion, where a power transmission between the first shaft and the second shaft is provided by means of belt discs on respective shaft and one or more belts that are tightened over the two belt discs.

In FIG. 1 it is thus schematically shown that the first belt disc 1 is arranged at a first rotating shaft 3, which in turn constitutes a part of a first, propelling unit 4, e.g. a motor. Further, the second belt disc 2 is arranged at a second rotating shaft 5, which in turn constitutes a part of a second unit 6 that is propelled by said first unit 4.

At alignment of the belt discs 1, 2 with the device according to the invention, the belt (which is indicated schematically with dotted lines in FIG. 1) which during normal operation of the units 4, 6 runs around both belt discs 1, 2, be either unassembled or assembled.

The invention comprises a transmitter unit 7 that is mounted on the first belt disc 1, more closely at a position along the peripheral edge 8 of the belt disc 1, against which said belt may bear. According to what will be described in detail below, the transmitter unit 7 comprises a light source for generation of light with a predetermined pattern. According to the embodiment this light source is constituted by a laser device 9 which is arranged to generate a laser line 10 when activated, which laser line 10 incides against a receiver unit 11. The receiver unit 11, which in FIG. 1 is shown obliquely from behind, but is more clearly apparent in FIG. 2, is in turn mounted on the second belt disc, more precisely along the peripheral edge 12 of the second belt disc 2.

According to what will be described in detail below, the receiver unit 11 is arranged in such a way that the laser line 10 incides against two detectors arranged along separated planes regarding their distances to the transmitter unit 7.

The invention may be realised by a laser device 9 which may have different wave lengths and effects. Suitably, a laser device 9 with a relatively small effect is used, which laser device 9 generates laser light with a wave length of 635–670 nm. The transmitter unit 7 is also arranged in such a way that the laser line 10 is provided an extension which mainly coincides with the extension of respective belt disc 1, 2. In this way, the laser line 10 constitutes an extension of the plane along which the respective belt disc 1, 2 is arranged.

Figure 2:
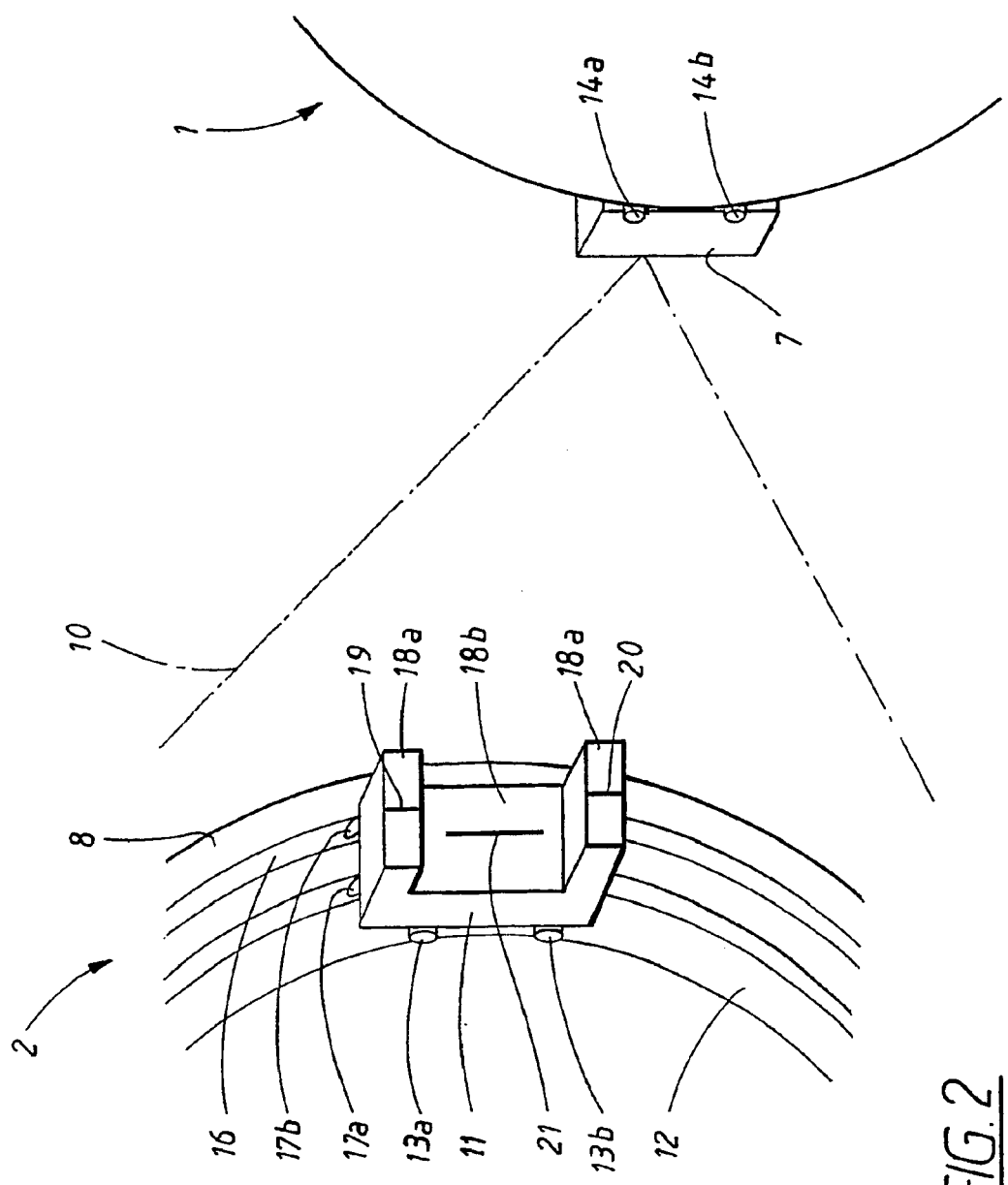
FIG. 2 is a further perspective view of said device.

FIG. 2 shows the same arrangement as according to FIG. 1, but from another angle, and somewhat enlarged. From the figure it is apparent that the receiver 11 is formed with an attachment device which, when the belt disc 2 is made of a magnetic material, preferably consists of two magnets 13a, 13b. The magnets 13a, 13b are firmly arranged on the back of the receiver unit 11, and then exercise a retaining force against the peripheral edge 12. The transmitter unit 7 is also arranged with magnets 14a, 14b for attachment against its belt disc 1.

According to the embodiment, the receiver unit 11 is mounted along the periphery 8 of the first belt disc 1 in such a way that it is mechanically coupled to and connected with at least one wedge-shaped groove 16, which in a way that is known in itself, runs around the periphery 8 of the belt disc 1. This wedge-shaped groove 16 is otherwise used for fixing the position of the belt or the belts that are intended to be tightened around the belt discs 1, 2 during normal operation. In a corresponding way, the transmitter unit 7 is firmly connected with a wedge-shaped groove 15 (see FIG. 1) along the edge of the second belt disc 2.

The receiver unit 11 is further formed in such a way that it may be mounted at its belt disc 2 with a predetermined placement in relation to its wedge-shaped groove 16, i.e. in relation to the, belt that normally shall be used around the belt discs 1, 2. For this purpose, the receiver unit 11 comprises at least one, preferably two, reference components 17a, 17b that protrudes from the back of the receiver unit 11 and into the respective wedge-shaped groove. The reference components 17a, 17b are then formed in such a way that they run along the back of the receiver unit 11 and such that they protrude into and fit against the corresponding wedge-shaped groove in the belt disc 2. Suitably, the respective reference component 17a, 17b has a profile that mainly is V-shaped, but other forms may alternatively occur in order to be adapted against the shape of different types of recesses and grooves, e.g. in the form of wedge-shaped grooves, along an edge of a belt disc.

By means of the respective reference component 17a, 17b, a reference which relates to the centre of the corresponding wedge-shaped groove is obtained. The reference components 17a, 17b may also be made to be detachable and exchangeable, which means that the systems may be used for different types of belt discs, by simply exchanging the reference components for other types that provide correct position in relation to the belt or the belts which are intended to be used at the respective application.

In a way corresponding to the receiver unit 11, the transmitter unit 7 is formed with corresponding reference components (not apparent from FIG. 2) for attachment against corresponding wedge grooves along their belt disc 1. In a way corresponding to the receiver unit 11, these further reference components are arranged to co-operate at a predetermined position with the wedge-shaped groove 16 in the other belt disc 2. These reference components may also be made detachable and exchangeable, allowing the attachment of the transmitter unit 7 to be adapted to, for example, different types of belt discs.

The receiver unit 11 comprises a first detector 18a and a second detector 18b for detection of the position for the laser-line 10 that incides from the transmitter unit 7. The detectors 18a, 18b are used for determining if the belt discs 1, 2 are correctly aligned. It is an important principle of the invention that the two detectors 18a, 18b are situated at different planes, which planes are separated depthwise, i.e. they are arranged at two separate planes with different distances to the transmitter unit 7, in the extension of the laser line 10. The receiver unit 11 is thus mainly formed as a "C", seen from the side, where the first detector 18a is positioned at a distance from the transmitter unit 7 that is shorter than the distance from the second detector 18b. Thus, it may be determined that the receiver unit 11 defines two detector surfaces or detector planes which are defined by the surfaces along which the two detectors 18a, 18b are formed. These detector planes are suitably mainly parallel to each other and arranged with an extension mainly perpendicular to the propagation direction of the laser line 10, however with different distances to the transmitter unit 7.

According to the embodiment that is shown in FIGS. 1 and 2, the respective detector 18a, 18b further comprises a target board with a marking in the form of at least one vertical line, which constitutes a marking on which the laser line 10 is intended to incide. The first detector 18a is suitably divided into two separate parts which surround the other detector 18b vertically. The first detector 18a thus comprises two lines 19, 20 with an extension in the same plane as the belt disc 2, while the other detector 18b comprises a corresponding line 21 with an extension in the same plane as the belt disc 2, but at a further distance from the transmitter unit 7 than the two first mentioned lines 19, 20. The device according to the invention is calibrated in such a way that a correct alignment of the belt discs 1, 2, without parallel, angular or twist error, corresponds to a situation where the laser line 10 from the transmitter unit 7 incides in such a way that it is projected along all three detector lines 19, 20, 21 at the same time. This in turn corresponds to the fact that the belt or the belts that are tightened around the belt discs 1, 2 runs straight and smoothly, without being effected by any lateral force.

According to alternative embodiment, the respective detectors 18a, 18b may be formed with a number of parallel lines instead of only one. In that way, a measuring scale is formed, which may facilitate at manual, i.e. visual, observation of possible errors in the adjustment between the two belt discs 1, 2.

During alignment of the belt discs 1, 2, the transmitter unit 7 and the receiver unit 11 are thus mounted along the peripheral edge of the respective belt disc 1, 2. Then the laser device 9 is activated, thus bringing the laser line 10 to incide against the receiver unit 11. The laser device is pre-calibrated in such a way that the laser line 10 is provided with an extension along a plane that corresponds to the extension of the belt discs 1, 2. When the laser line 10 that incides against the receiver unit 11 falls along the markings that are defined by the lines 19, 20, 21, which have been described above, it may be determined that the two belt discs 1, 2 are correctly aligned in relation to each other. When conformance is not acquired, adjustment of the position of the belt discs in relation to each other has to be done. This may in turn be done by adjusting the position of one or both of the units 4, 6, or by adjusting the mounting of one or both the belt discs 1, 2 on the respective shaft 3, 5.

Figure 3A:
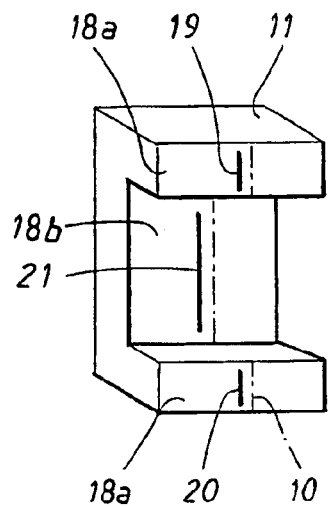
FIG. 3a shows how a receiver unit according to the invention may be used at a detection of parallel errors.
Figure 3B:
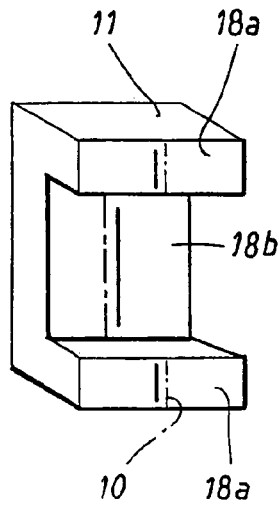
FIG. 3b shows how said receiver unit may be used at detection of angular errors.
Figure 3C:
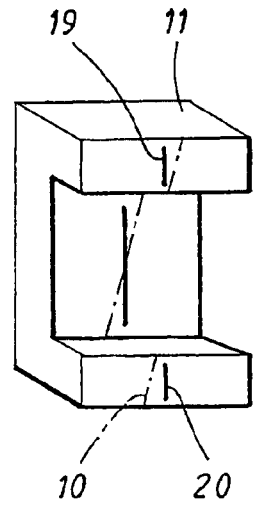
FIG. 3c shows how said receiver unit is used at detection of twist errors.

In FIG. 3a–c it is shown how different types of incorrect adjustments of two belt discs appear using a detection by means of invention. More particularly it is shown in the FIGS. 3a–c how the laser line 10, which is shown in the form of a dotted line, is projected over the receiver unit 11 at different types of incorrect adjustments of the belt discs 1, 2. FIG. 3a shows a first example of how the laser line 10 incides at an incorrect adjustment that results in a parallel error, i.e. where the two belt discs have their extension along two separate planes which are parallel in relation to each other. In such a case, the laser line 10 will incide as shown in FIG. 3a, i.e. in such a way that the laser line 10 is displaced laterally mainly at the same magnitude in relation to all the lines 19, 20, 21 in the two detectors 18a, 18b. For correction of the parallel error, the belt discs 1, 2 will then have to be displaced in relation to each other to such an extent that the laser line 10, when manually inspected, incides and is projected along the three lines 19, 20, 21 at the same time.

At an angular error between the belt discs, i.e. when the planes along which the belt discs are arranged have a certain angle in relation to each other, the laser line 10 will incide against the receiver unit 11 as shown in FIG. 3b, i.e. as a difference in side position between the position of the laser line 10 on the first and the second detector 18a, 18b, respectively.

At a so called twist-error, the laser line 10 will incide according to what is shown in FIG. 3c. This corresponds to that the laser line incides with a difference in side position between the two lines 19, 20 which together constitute the first detector 18a. This corresponds to that the planes along which the belt discs are arranged have been "screwed", i.e. been turned at a varying degree around an imaginary longitudinal line which runs along the centre of the belt discs.

Combinations of the three error types mentioned above may also occur.

The error detection that has been described above with reference to FIGS. 3a–3c is thus based on a manual inspection by an operator, who controls how the laser line 10 incides over the receiver unit 11 and adjusts the setting of the belt discs in relation to each other if any error is present.

The invention is arranged in such a way that the laser light of the transmitter unit 7 corresponds to an extension of the groove 15 (see FIG. 1) in its belonging belt disc 1, i.e. an extension of the plane along which the groove 15 is arranged. The light from the transmitter unit 7 is then detected by means of the target boards which are defined by the detectors 18a, 18b in the receiver unit 11, according to what has been explained above.

Figure 4:
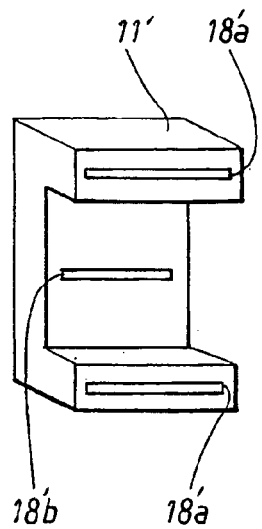
FIG. 4 shows a receiver unit according to a second embodiment.

In FIG. 4, an alternative design of a receiver unit 11' is shown, which comprises two detectors 18a', 18b', which in turn comprise two sets of photo-sensitive sensors. The first detector 18a' is then formed by two photo-sensitive sensors which are placed above and below a further photo-sensitive sensor which constitutes the second detector 18b'. As well as for the above-mentioned embodiment, the two detectors 18a', 18b' are according to FIG. 4 arranged in such a way that they are positioned at different planes depthwise, i.e. they are arranged at two separated planes with different distances to a corresponding transmitter unit (not shown in FIG. 4) that corresponds to the transmitter unit that has been described with reference to FIGS. 1 and 2.

At the alternative embodiment according to FIG. 4, different types of sensors may be used, e.g. position sensitive detectors (PSD) or photo diodes. When a laser light line inciding from the transmitter unit strikes the receiver unit 11' in such a way that both sets of sensors are struck by laser light, this may be registered electronically by means of an electronic unit (not shown), which suitably may be integrated in the receiver unit 11'. The different types of errors that then may occur, i.e. parallel error, angular error and twist error, may then be detected automatically by a suitable setting of the sensors and a suitable design of said electronic unit. The errors may then be indicated for the user by means of suitable indicator, e.g. in the form of a set of light emitting diodes or a display unit (not shown) which then provides support for a correction of the positions of the belt discs. Then the possible errors may be eliminated. This electronic detection is a somewhat more complicated solution which, however, enables detection of possible alignment errors with a higher accuracy than manual detection.

Alternatively, the receiver unit 11' may be connected to an external evaluation unit for the determining of whether the laser light incides in an expected way or if any error has occurred. Depending on the result from the detection at the respective measuring unit, the machines or the like at which the belt discs are used may be adjusted manually such that a correct alignment is obtained.

Figure 5:
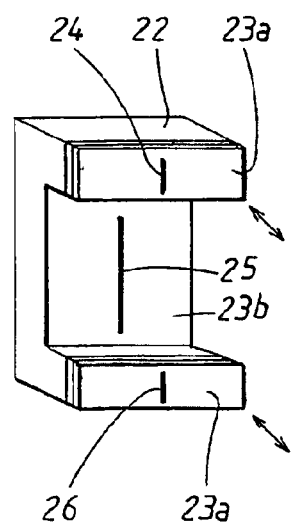
FIG. 5 shows a receiver unit according to a third embodiment.

According to an alternative embodiment of the invention, a receiver unit according to FIG. 5 may be used. According to this embodiment, the distance between the two detector surfaces that are defined by a first detector 23a and a second detector 23b, respectively, is variable. This may be obtained by means of a design of the receiver unit 22 where the portions where the detectors 23a, 23b are arranged are made displaceable, according to what is indicated symbolically with arrows in FIG. 5. This displacement of the detectors 23a, 23b then takes place in a direction that mainly coincides with the propagation direction of the laser line 10 (see FIG. 1). This may for example be enabled by means of a pin (not shown) or similar on the back of the respective part of the first detector 23a, which pins may be formed to be telescopically displaceable in the part of the receiver unit 22, which comprises the second detector 23b. Thus, the distance depthwise between the first detector 23a and second detector 23b may be chosen in a way which admits an optimal accuracy during measurements with the invention.

Similarly to the embodiment that is shown in FIGS. 1, 2 and 3a–c, the detectors 23a, 23b according to FIG. 5 are equipped with lines 24, 25, 26, which facilitates a manual alignment procedure. Alternatively, the detectors 23a, 23b have a function that corresponds to those detectors that are shown in FIG. 4, i.e. in the form of two sets of photo-sensitive sensors that admit an electronic, automatic detection.

By forming the first detector 23a—similar to the above-mentioned embodiments—as two separate parts which surround the second detector 23b, these two parts may be made displaceable independently of each other. This means that the invention may be used for detection with detectors arranged along three separate detector planes, which then may be adjusted in such a way that they are separated depthwise in relation to the corresponding transmitter unit. Such measurement admits a higher degree of accuracy than when measuring by means of detectors arranged along two planes. For such design, the three lines 24, 25, 26 (or the corresponding photo-sensitive sensors), may be considered to constitute three separate detectors that may be used independently of each other.

Principally, the second detector 23b may also be made displaceable in the same direction as the first detector 23a, and independent of the position of the first detector 23a.

Figure 6:
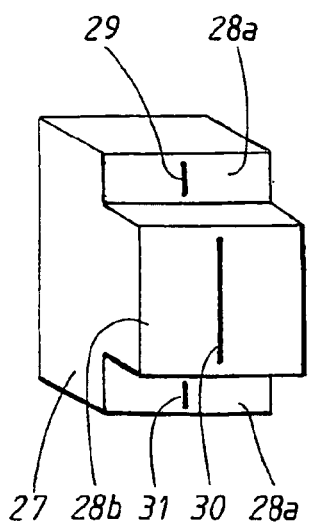
FIG. 6 shows a receiver unit according to a fourth embodiment.

In FIG. 6, a receiver unit 27 according to a further embodiment of the invention is shown. This receiver unit 27 has a function that corresponds to what is shown in FIGS. 1, 2 and 3a–c, and which for this purpose is equipped with a first detector 28a and a second detector 28b. Unlike what has been shown in for example FIG. 3a, the second detector 28b is, however, arranged at a distance from the corresponding transmitter unit that is shorter than the corresponding distance for the first detector 28a. The receiver unit 27 according to FIG. 6 is equipped with lines 29, 30, 31, which are used at a manual alignment procedure, but alternatively the detectors in the receiver unit 27 may have a function that corresponds to what is shown in FIG. 4, i.e. in the form of two sets of photo-sensitive sensors that admit an electronic, automatic error detection.

The alternative receiver units that are shown in FIG. 5 and FIG. 6 may be used together with the transmitter unit 7 that is shown in FIGS. 1 and 2.

Figure 7:
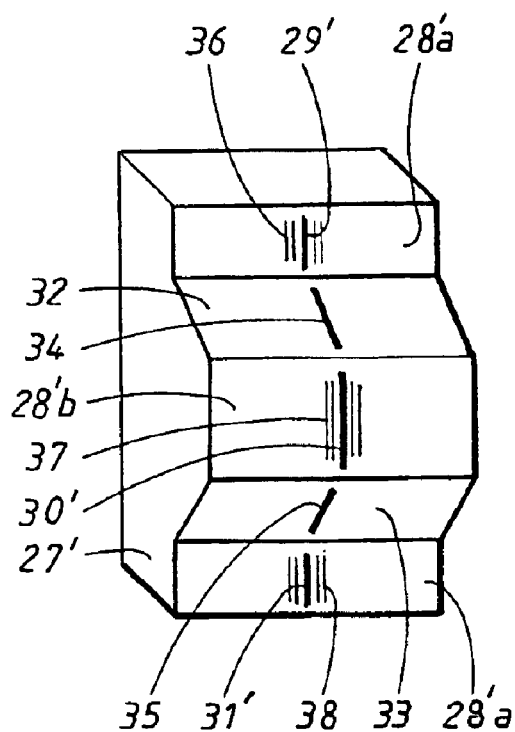
FIG. 7 shows a receiver unit according to a fifth embodiment.
Figure 8:
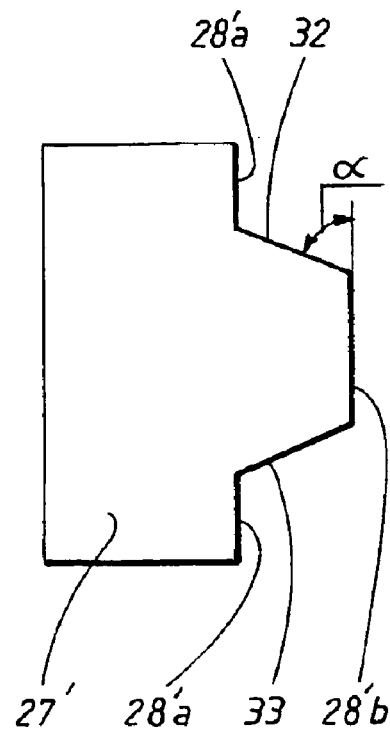
FIG. 8 shows a side view of the receiver unit according to FIG. 7.

FIGS. 7 and 8 show an alternative receiver unit 27', according to a further embodiment that mainly is based on the receiver unit 27 according to FIG. 6, and which comprises a first detector 28'a and a second detector 28'b. These detectors 28'a, 28'b correspond to the target boards (28a, 28b) that are shown in FIG. 6 in that way that they are formed in such a way that the second detector 28'b is arranged at a distance from the corresponding transmitter unit that is shorter than the corresponding distance for the first detector 28'a. The receiver units 28'a, 28'b according to FIG. 7 are formed as target boards, which for this purpose comprise lines 29', 30', 31' which are used at a manual alignment procedure.

Alternatively, the detectors 28'a, 28'b in the receiver unit 27' may have a function that corresponds to what is shown in FIG. 4, i.e. in the form of two sets of photo-sensitive sensors which admit an electronic, automatic error detection.

According to what is apparent from FIG. 7, the receiver unit 27' is formed with a further reading element in the form of a first reading surface 32 and a second reading surface 33. These reading surfaces 32, 33 are formed as inclined planes, i.e. with a certain angle in relation to the plane along which the two detectors 28'a, 28'b, have their extension. This inclination of the reading surfaces 32, 33 is more clearly apparent from FIG. 8, which is a side view of the receiver unit 27' according to FIG. 7. From FIG. 8 it is thus apparent that the first reading surface 32 has an angle $\alpha$ in relation to the plane of the second detector 28'b. Preferably, the plane of the second detector 28'b is also parallel with the plane of the first detector 28'a. The angle $\alpha$ is preferably of the magnitude 60–80°, but other values for the angle $\alpha$ are possible within the scope of the invention. From FIG. 8 it also apparent that the planes which are defined by the two target boards, that together form the first detector 28'a, mainly coincide in their extension. It is further apparent from FIG. 8 that the planes along which the three target boards have their extension mainly are perpendicular to the angle of incidence of the laser light from the corresponding transmitter unit (see FIGS. 1 and 2).

The purpose of the reading surfaces 32, 33 is to constitute a support during manual reading by means of the receiver unit 27', i.e. in order to facilitate reading for an operator by determining if a laser line from a transmitter unit (see FIGS. 1 and 2) incides in a correct manner against the receiver unit 27'. For this purpose, the respective reading surface 32, 33 is equipped with a first line 34 and a second line 35, respectively, or similar markings, which facilitates this reading.

Preferably, the receiver unit 27' according to FIGS. 7 and 8 is formed in such a way that the above-mentioned lines 29', 30', 31' are supplemented with scale divisions 36, 37, 38, i.e. further line-formed markings which are parallel with the above-mentioned lines 29', 30', 31'. Thus, the scale divisions 36, 37, 38 define a measuring scale which facilitates during manual, i.e. visual, reading by observation of the incidence of a laser line against the receiver unit 27'. It can particularly be noted that the design of the receiver unit 27' with the different scale divisions 36, 37, 38 admits a direct visual detection of an absolute value concerning any occurring angular error at alignment of two belt discs. This is possible as the division of the scale divisions 36, 37, 38, i.e. the distances between the scale division 36, 38 of the first detector 28'a and the distances between the scale division 37 of the second detector 28'b, are chosen depending on the distance between the planes that are defined by the first detector 28'a and the second detector 28'b, respectively. The division between the scale divisions 36, 37, 38 can then be chosen such that, for example, the distance between two adjacent scale divisions corresponds to a certain granted absolute value concerning an angular error. This creates conditions for a simple and effective manual reading, where a measure of possible angular errors may be read directly by means of the scale divisions.

Even if the embodiment according to FIGS. 7 and 8 suitably is equipped with scale divisions 36, 37, 38 according to what has been described above, the invention is not limited to this, but the receiver unit 27' may also be made without such scale divisions.

It may also be noted that the embodiments that have been described above with reference to FIGS. 1–6, also may be equipped with scale divisions of the same type as shown in FIGS. 7 and 8. This has also been mentioned above.

The invention is not limited to the embodiments that have described above and shown on the drawings, but may be varied within the scope of the appended claims. For example, the invention may be used for alignment of different components which in particular are intended to be positioned along a common plane. The invention is particularly suited for applications that are based on belt propulsion, e.g. in connection with fan devices, gears, machines, etc.

The invention is not limited to components that are connected with each other with e.g. chains or belts, but may also be applied for alignment of components that stand alone, where such need exists. For example, the invention may be used for alignment of rollers, pipes, shafts and similar components that stand alone.

The receiver unit that is used according to the invention may consist of a complete, integrated unit that comprises the two detectors that admit the current alignment, or may alternatively be divided into two or more separate elements, e.g. three partial elements that comprise the three different parts that together form the two detectors (see for example FIG. 3a). Then these three separate partial elements are mounted in connection with each other on the current belt disc.

When the invention is used for belt discs, it may be applied at belt discs that are formed with the wedge-shaped grooves described above, and also at systems that comprise belt discs with other kinds of grooves or recesses and which admit a reference to the belt or the belts that are intended for the belt discs.

The patterns that are generated by the respective laser device may consist of straight, continuous lines, broken lines, or other suitable patterns that unambiguously define the plane of the respective belt disc. When laser lines are generated, these may be in line with the plane along which the respective belt disc is arranged, or may alternatively be displaced in a parallel manner with said plane.

The reference components mentioned above may be used to be related to positions as well as along the periphery as the side of the respective belt disc.

What is claimed is:

1. Device for alignment of a first component (1) and a second component (2) in a predetermined relation to each other, said components (1. 2) consisting of power transmitting devices of the type chain propulsion or belt propulsion, comprising a transmitter unit (7) arranged for mounting on the peripheral edge (8) of said first component (1) and comprising a light source (9) for generation of light radiation (10) with a predetermined pattern in the direction towards a receiver unit (11; 11'; 22, 27; 27') arranged for mounting on the peripheral edge (12) of said second component (2), where the receiver unit (11; 11') comprises a detector device (18a, 18b; 18a', 18b'; 23a, 23b; 28a, 28b; 28'a, 28'b) for said light radiation (10) and wherein said detector device (18a. 18b; 18a', 18b'; 23a, 23b; 28a, 28b; 28a', 28b') comprises a first detector (18a; 18a'; 23a, 28a, 28a') and a second detector (18b; 18b'; 23b; 28b; 28b'), respectively, which are separated depthwise in relation to said transmitter unit (7), characterized in, that:

the first detector (18a; 18a'; 23a; 28a; 28a') comprises a first target and a second target and that the second detector (18b; 18b'; 23b; 28b; 28a') comprises a third target, that the first target and the second target surround the third target, that the first target and the second target are arranged along essentially the same plane, that said targets comprise markings (19, 20, 21; 24, 25, 26; 29, 30, 31) upon which said light radiation is intended to incide, and that said targets extend along essentially the same planes, which are generally perpendicular in relation to the direction of incidence of said light radiation.

2. Device according to claim 1, characterized in that each target is provided with a measuring scale in the form of a number of parallel lines, for manual readings during said alignment.

3. Device according to claim 1, characterized in, that said light source (9) consists of a laser device for generation of laser light for defining said light pattern (10).

4. Device according to claim 1 characterized in, that said light pattern (10) consists of a line directed towards the respective component (1,2).

5. Device according to claim 1, characterized in, that said detection device consists of two separate detectors (18a, 18b; 23a, 23b; 28a, 28b; 28'a, 28'b), which have markings (19, 20, 21; 24, 25, 26; 29, 30, 31; 29', 30', 31') for manual comparison whether said light pattern (10) at correct alignment of said components (1, 2) runs through predetermined positions on the sensor elements (18a, 18b; 23a, 23b; 28a, 28b, 28'a, 28'b) at the same time.

6. Device according to claim 5, characterized in, that said receiver unit (27') comprises a first reading surface (32) and a second reading surface (33) which are formed as inclined planes with an extension between the first detector (28'a) and the other detector (28'b), respectively.

7. Device according to claim 1, characterized in, that said first detector (28a') and said second detector (28'b) comprise line formed markings (36, 37, 38), which define a measuring scale for reading during said alignment.

8. Device according to claim 7, characterized in, that the distances between said line formed markings (36, 37, 38) are chosen to, depending on the distance between the planes that are defined by said first detector (28*a*') and said second detector (28'*b*), correspond to a value concerning any occurring angular error at said alignment.

9. Device according to claim 1, characterized in, that said detection device consists of two separated light sensitive sensor elements (18*a*', 18*b*'), which are calibrated in such a way that said light pattern (10) runs through predetermined positions on the sensor elements (18*a*', 18*b*') at the same time when said components (1, 2) are aligned correctly.

10. Device according to claim 1, characterized in, that said belt discs (1, 2) comprise peripheral wedge-shaped grooves (15, 16), and that the transmitter unit (7) and the receiver unit (10), respectively, comprise reference components (17*a*, 17*b*) formed to fit against the respective wedge-shaped groove (15,16).

11. Device according to claim 1, characterized in, that said transmitter unit (7) and receiver unit (11), respectively, are arranged for mounting against the respective component (1,2) by means of magnetic force of magnets (13*a*, 13*b*, 14*a*, 14*b*) included in the transmitter unit (7) and the receiver unit (11), respectively.

12. Device according to claim 1, characterized in, that at least one of said detectors (23*a*) is displaceable depthwise in relation to said transmitter unit.

13. Device according to claim 1, characterized in, that the first detector (23*a*) is arranged in such a way that it is divided along two separate surfaces which are separated depthwise in relation to said transmitter unit and in relation to the surface which is defined by the second detector (23*b*), thus defining three separate detectors.

14. Device according to claim 1, characterized in, that said first detector (18*a*; 18*a*'; 23*a*; 28*a*; 28*a*ᶠ) and said second detector (18*b*; 18*b*'; 23*b*; 28*b*; 28'*b*), respectively, have their extension along planes which mainly are perpendicular in relation to the angle of incidence of said light radiation.

15. Device according to claim 1, characterized in, that said second detector (28*b*: 28*b*') is arranged at a distance from said transmitter unit (7) which is less than the distance to said first detector (28*a*).

16. Receiver unit (11; 11'; 22, 27; 27') intended to co-operate with a transmitter unit (7) for alignment of a first component (1) and a second component (2) in a predetermined relation to each other, said components (1,2) consisting of power transmitting devices of the type chain propulsion or belt propulsion, which receiver unit (11; 11'; 22; 27; 27') is arranged for mounting on the peripheral edge of one of the components (1) and arranged for detection of a light pattern (10) emitted by said transmitter unit (7), and that it comprises a detection device (18*a*, 18*b*; 18*a*', 18*b*'; 23*a*, 23*b*; 28*a*, 28*b*; 28'*a*, 28'*b*) which in turn comprises a first detector (18*a*; 18*a*'; 23*a*; 28*a*; 28'*a*) and a second detector (18*b*; 18*b*'; 23*b*; 28*b*; 28'*b*), respectively, which are separated depthwise in relation to said transmitter unit (7), characterized in, that:

the first detector (18*a*; 18*a*'; 23*a*; 28*a*; 28*a*') comprises a first target and a second target and that the second detector (18*b*; 18*b*'; 23*b*; 28*b*; 28*b*')comprises a third target, that the first target and the second target surround the third target, that the first target and the second target are arranged along essentially the same plane, that said targets comprise markings (19, 20, 21; 24, 25. 26; 29, 30, 31) upon which said light radiation is intended to incide, and that said targets extend along essentially the same planes, which are generally perpendicular in relation to the direction of incidence of said light radiation.

17. Method for alignment of a first component (1) and a second component (2) in a predetermined relation to each other, said components (1. 2) consisting of power transmitting devices of the type chain propulsion or belt propulsion, comprising:

mounting a transmitter unit (7) on the peripheral edge of said first component (1), mounting a receiver unit (11; 11'; 22, 27; 27') on the peripheral edge of said second component (2), generating a light pattern (10) from the transmitter unit (7) in the direction towards the receiver unit (11; 11'; 22; 27; 27'), detecting said light pattern (10) by means of the receiver unit (11; 11'; 22; 27; 27') and detecting said light pattern by means of a first detector (18*a*; 18*a*'; 23*a*; 28*a*; 28'*a*) and a second detector (18*b*; 18*b*'; 23*b*; 28*b*; 28'*b*), respectively, which are arranged on said receiver unit (11; 11'; 22; 27; 27') in a manner so that they are separated depthwise in relation to said transmitter unit (7), characterized in, that said method comprises:

detecting said light pattern with a first target and a second target of the first detector (18*a*; 18*a*'; 23*a*; 28*a*; 28*a*') and a third target of the second detector (18*b*; 18*b*'; 23*b*; 28*b*; 28*b*'), wherein the first target and the second target surround the third target, and the first target and the second target are arranged along essentially the same plane, and detecting said light pattern by means of reception of said light radiation on markings (19, 20, 21; 24, 25, 26; 29, 30, 31) of said targets, wherein said targets extend along essentially the same planes, which are generally perpendicular in relation to the direction of incidence of said light radiation.

* * * * *